United States Patent

[11] 3,543,799

[72] Inventor Dennis J. Hayman
East Detroit, Michigan
[21] Appl. No. 722,768
[22] Filed April 19, 1968
[45] Patented Dec. 1, 1970
[73] Assignee Hydrometals Inc.
Dallas, Texas
a corporation of Illinois. by mesne assignments

[54] SINGLE HANDLE FAUCET VALVE
8 Claims, 9 Drawing Figs.
[52] U.S. Cl. .................................................. 137/636.2,
137/625.17; 251/174
[51] Int. Cl. .................................................. F16k 11/00
[50] Field of Search ..... ................................. 137/625.17,
625.4; 636.3, 636.2, 636.4; 251/174

[56] References Cited
UNITED STATES PATENTS

| 2,977,986 | 4/1961 | Hinderer et al. | 137/625.17 |
| 3,035,612 | 5/1962 | Lyon | 137/625.17 |
| 3,324,884 | 6/1967 | Dornaus | 137/625.17 |
| 3,372,710 | 3/1968 | Miller | 137/625.17 |
| 3,384,119 | 5/1968 | Manoogian | 137/625.17 |

*Primary Examiner*— William R. Cline
*Attorney*— Wofford and Felsman

ABSTRACT: A single handle faucet valve comprising a body having a cylindrical opening therein into which hot and cold water inlets extend. A control disc is movable in said opening to selectively uncover said inlets. The control disc is operated by a lever which is swivelly mounted in the body. The degree of movement of the lever is controlled by projections and by a cap member threaded onto the body.

INVENTOR.
DENNIS J. HAYMAN
BY
Barnes, Kisselle, Raisch & Choate
ATTORNEYS

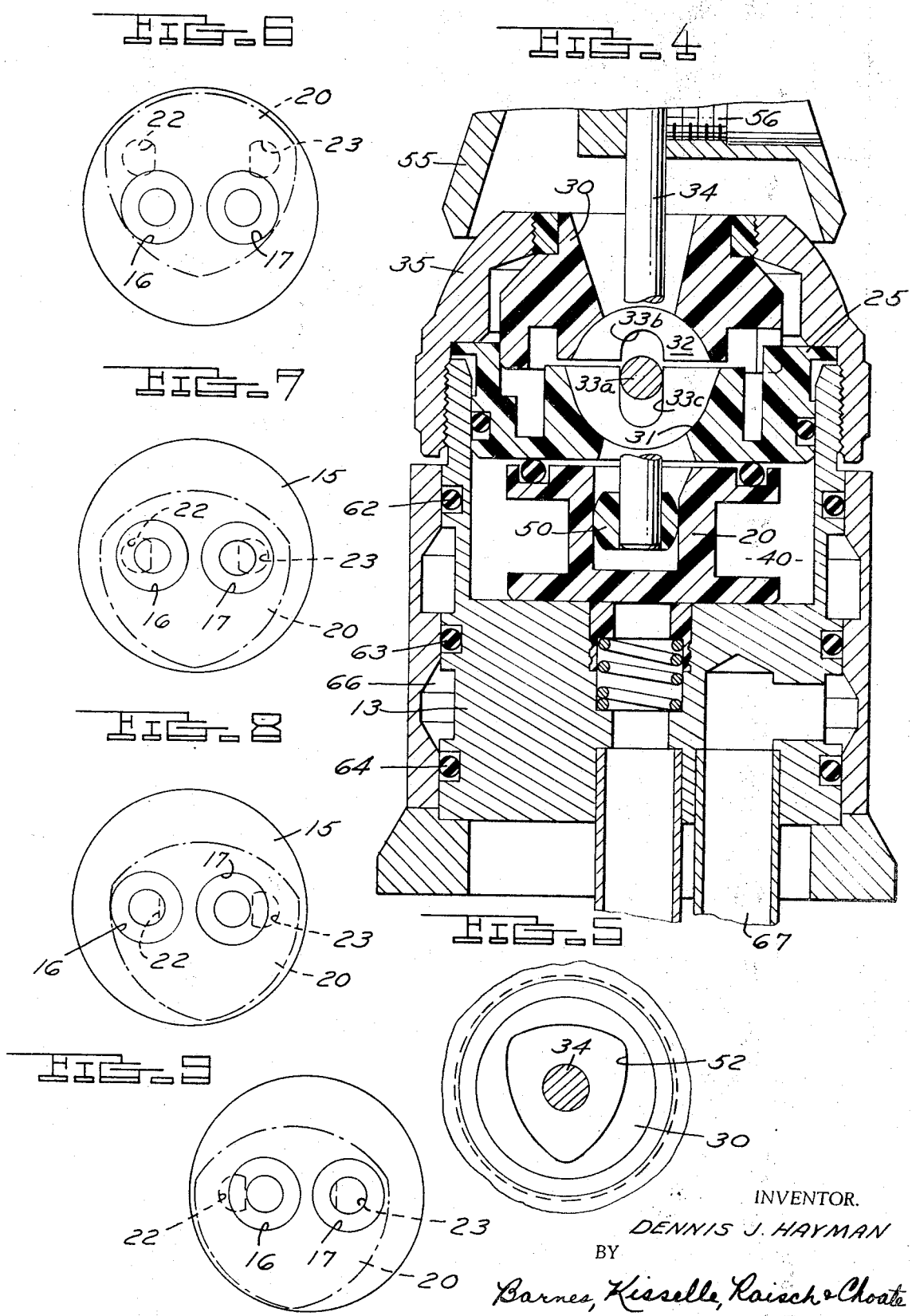

SINGLE HANDLE FAUCET VALVE

This invention relates to single handle faucet valves.

In the copending U.S. Pat. applications of Larry J. Miller, Ser. No. 537,257, filed March 17, 1966, now U.S. Pat. No. 3,372,710 and Larry J. Miller and Dennis J. Hayman, Ser. No. 573,601, filed Aug. 19, 1966, now abandoned, there are disclosed and claimed single handle faucet valves of a novel design.

Among the objects of this invention are to provide an improved single handle faucet valve of the type shown in the aforementioned patent applications which is capable of being manipulated readily to turn the water on or off and to control the mixture of hot and cold water that is provided; which is capable of long life; which is relatively free of maintenance; and which can be readily assembled and disassembled.

In the drawings:

FIG. 4 is a fragmentary sectional view taken along the line 4-4 in FIG. 1.

FIG. 5 is a fragmentary sectional view taken along the line 5-5 in FIG. 1.

FIGS. 6—9 are partly diagrammatic views showing the relative positions of the parts at different settings.

Figure 1:
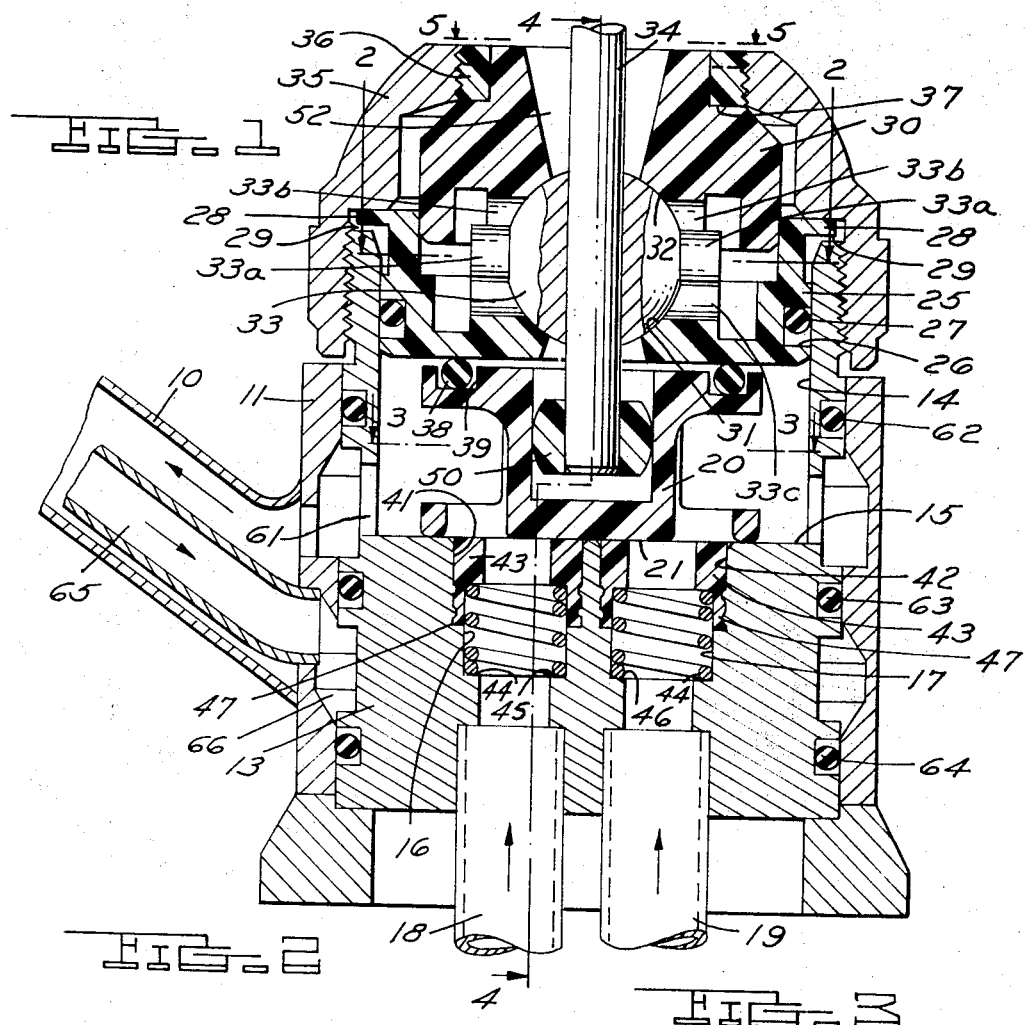
FIG. 1 is a vertical sectional view through a valve embodying the invention.

Referring to FIG. 1, the faucet valve embodying the invention is adapted to be used with various spout configurations including the type shown in FIG. 1 wherein a spout 10 has a sleeve or cylinder 11 attached thereto and rotatably mounted on the single handle faucet valve.

The single handle faucet valve comprises a body 13 that is formed with a cylindrical chamber or opening 14 that opens upwardly to the upper end of the body. The bottom surface 15 of the chamber 14 is substantially flat and inlet passages 16, 17 extend upwardly from the bottom of the body through the surface 15. Hot and cold water, respectively, are supplied to the passages 16, 17 through inlet pipes 18, 19 which are swaged or otherwise provided in the openings.

Figures 2, 3:
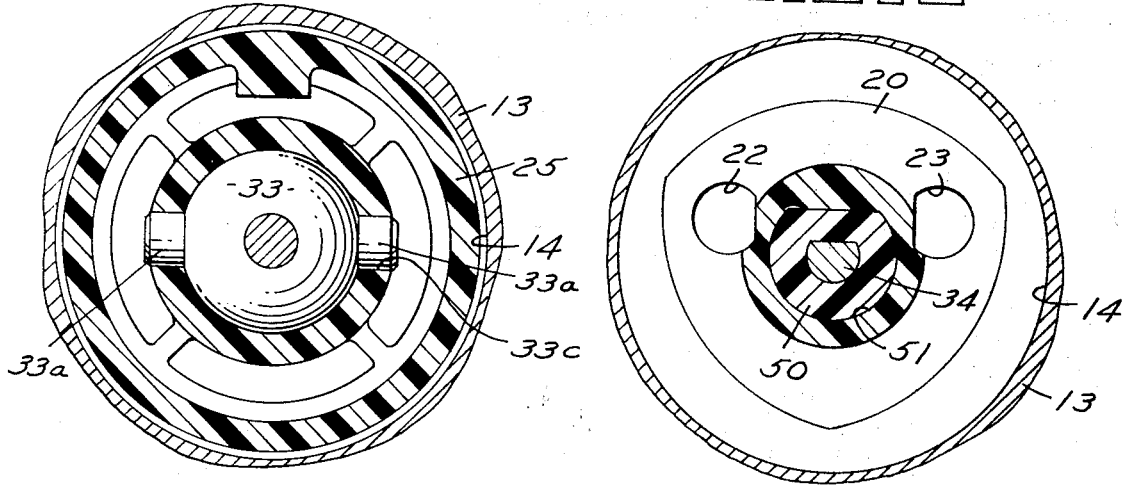
FIG. 2 is a fragmentary sectional view taken along the line 2-2 in FIG. 1.
FIG. 3 is a fragmentary sectional view taken along the line 3-3 in FIG. 1.

A control disc 20, which is preferably made of a low friction plastic material that is rigid, nondeformable and resistant to hot water, such as Delrin, is provided in the chamber 14. Control disc 20 is formed with a substantially flat bottom surface 21 that may engage the flat surface 15 of the chamber 14. The disc 20 is provided with noncircular openings 22, 23 that are adapted to be moved into registry with the upper ends of openings 16, 17 as shown in FIG. 3. As shown in FIG. 3, the disc 20 is generally triangular in shape and the sides thereof are convex.

A sealing member 25 is provided in the upper end of chamber 14 and has a peripheral circular groove 26 in which an O-ring 27 of resilient material such as synthetic rubber is provided to form a seal with the wall of the chamber 14. The upper end of sealing member 25 is provided with radially extending diametrically opposed projections 28 that extend into complementary depressions 29 in the upper end of the body 13 and thereby prevent rotation of the sealing member 25 relative to the body 13. A retaining member 30 of low friction material similar to the material of which the sealing member 25 is made is provided on the upper end of the body. Sealing member 25 and retaining member 30 have spherical seats 31, 32, respectively, which engage a spherical member 33, preferably of material that is dissimilar to that of members 25, 30 such as brass, that is fixed intermediate the ends of an operating lever 34. The retaining member 30 is urged downwardly against the spherical member 33 by a cap 35 that is threaded on the upper end of the body 13. An adjusting ring 36 is threaded in an opening in the upper end of the cap 35 and engages a shoulder 37 on the retaining member 30. The force of the retaining member 30 on the spherical member 33 and, in turn, the sealing member 25 urges the sealing member 25 downwardly against an O-ring 38 that is provided in a groove 39 in the upper end of the control disc 20 thereby yieldingly urging the control disc 20 downwardly toward the flat surface 15 of the chamber 14. By this arrangement, water may flow upwardly into chamber 40 but is prevented by O-ring 38 and O-ring 27 from moving upwardly and outwardly of the body 13.

Spherical member 33 has outwardly extending diametrical projections 33a which extend into slots formed by alined grooves 33b, 33c in the retaining member 30 and sealing member 25. By this arrangement, the movement of the lever 34 laterally as viewed in FIG. 1 is limited to a single vertical plane. This, in turn, limits the resultant movement of the control disc 20.

The upper ends 41, 42 of the inlet passages 16, 17 are enlarged to receive annular sealing members 43 of rubber or other suitable resilient material to provide a seal with the undersurface 21 of the control disc 20. In order to insure this seal, coil springs 44 are compressed between shoulders 45, 46 of the body and shoulders on the sealing rings 43. In addition, to insure that water will not seep between the surfaces of the enlarged openings 41, 42 and the respective sealing members 43, the lower end of each sealing member 43 has a bead 47 on the outer surface thereof integral with the member to provide a secondary seal in the nature of an O-ring seal.

As shown in FIGS. 1 and 2, an interconnecting member 50 of low friction material such as Delrin is fixed on the lower end of the lever 34 as by press fitting the member on a noncircular portion of the lever herein shown as having a D cross section. The spherical member 50 has a D cross section and engages D-shaped opening 51 in the upper end of the control disc 20 which has a complementary D cross section and vertical side walls. By this arrangement, oscillation of the control lever 34 will translate the control disc 20 along surface 15 without losing the sealing engagement of the control disc 20 with the surface 15.

The lever 34 is substantially circular in cross section and extends upwardly through an opening in the sealing disc 25 and through an intermediate opening 52 in the retaining member 30. The opening 52 has a generally triangular shape as shown in FIG. 5 and the sides of the opening are engaged by the lever 34 to confine the movement of the lever to a generally triangular area.

A knob 55 is fixed on the upper end of the lever 34 by a set screw 66 which is threaded into knob 55 (FIG. 4).

Retaining member 30 has a noncircular cross section and extends downwardly to a complementary opening in the upper end of the sealing member 25.

By the above arrangement, swinging of the lever laterally in the single plane controlled by the projections 33a and slots 33b, 33c causes the control disc 20 to move to the right or left as viewed in FIGS. 6—9. By swinging the lever 34 fore and aft as viewed in FIG. 1, the control disc 20 is moved up and down as viewed in FIGS. 6—9.

As shown in FIG. 6, in the "off" position, the control disc 20 is in position so that the openings 22, 23 are out of communication with the inlets 16, 17. As the lever 34 is swung to move the control disc 20 downwardly, the openings 22, 23 are brought into communication with the inlets 16, 17. By swinging the lever 34 to the right or left, the degree of registry of the openings 22, 23 with the inlets 16, 17 is controlled. Thus, in FIG. 7 equal amounts of hot and cold water are permitted to flow through the inlets 16, 17. As shown in FIG. 8, substantially no water flows through inlet 17 whereas substantially all the water flows through inlet 16. As shown in FIG. 9, substantially no water flows through inlet 16 and substantially all the water flows through inlet 17.

By swinging the control knob 55 and, in turn, the lever 34, the openings 22, 23 in the control disc are moved from positions in registry with the inlets 16, 17 to positions out of registry thereby controlling the total amount of water flowing through the inlets into the chamber or space 40.

By swinging the lever back and forth, the extent of communication or registry of the openings 22, 23 with the passages 16, 17 is controlled. Thus, by moving the lever to the left or counterclockwise as shown in FIG. 1, substantially the entire opening 22 may be brought into registry with the inlet passage 16 and the opening 23 moved out of registry with the inlet 17 so that only hot water will flow.

The area 40 communicates through a passage 61 in the body with the interior spout 10. A seal is provided between the body 13 and sleeve 11 of the spout by O-rings 62, 63, 64.

In accordance with well-known faucet valve construction, suitable means may be provided on the end of the spout 10 to return the water through a tube 65 into an annular passage 66 in the body 13 and downwardly through an outlet 67 and, in turn, a rinse tube (not shown).

I claim:

1. In a single handle faucet valve, the combination comprising:
    a. means defining a chamber having a substantially flat wall surface along one wall;
    b. hot and cold water inlets extending through said surface to said chamber;
    c. a control disc having a complementary flat surface with spaced openings therein movable into and out of registry with said inlets;
    d. a sealing member spaced from said substantially flat wall surface, with sealing means interposed between said sealing member and control disc providing a seal therebetween;
    e. a lever having a spherical member fixed thereon intermediate the lever length with the lever having a longitudinal axis coincident with a diameter of said spherical member;
    f. said sealing member having a complementary spherical surface on the upper end thereof which is engaged by said spherical member;
    g. a retaining member having a complementary spherical surface engaging said spherical member;
    h. means for urging said retaining member against said sphere and, in turn, urging said sphere against said sealing member, whereby said lever is journaled on said sealing member;
    i. interengaging means on said sphere and said sealing member and said retaining member for guiding said lever so as to confine said lever longitudinal axis to rectilinear swinging movement about the center of said sphere in directions parallel and normal to the plane of symmetry which is normal to said control disc complementary flat surface and bisects said control disc and is perpendicular to a line passing through the centers of the control disc spaced openings; and
    j. means interconnecting one end of said lever with said control disc such that swinging of said lever moves said control disc so that the centers of said control disc spaced openings are confined to rectilinear movement parallel to and normal to said plane of symmetry.

2. The single handle faucet valve as set forth by claim 1, wherein there is additionally provided limiting means engageable with said lever outwardly of said spherical member for limiting movement thereof within a substantially triangular area.

3. The single handle faucet valve as set forth by claim 2, wherein said limiting means comprises a recess in said retainer member through which said lever extends.

4. The single handle faucet valve as set forth by claim 3, wherein said recess is substantially triangular in transverse section and comprises inwardly converging sidewalls such that a peripheral bearing surface of said lever extending longitudinally thereof will be substantially contiguous with a sidewall portion when abutting same.

5. In a single handle faucet valve, the combination comprising:
    a. means defining a chamber having a substantially flat wall surface along one wall;
    b. hot and cold water inlets extending through said surface to said chamber;
    c. a control disc having a complementary flat surface with spaced openings therein movable into and out of registry with said inlets;
    d. a sealing member spaced from said substantially flat wall surface, with sealing means interposed between said sealing member and control disc providing a seal therebetween;
    e. a lever having a spherical member fixed thereon intermediate the lever length, with the lever having a longitudinal axis coincident with a diameter of said spherical member;
    f. said sealing member having a complementary spherical surface of the upper end thereof which is engaged by said spherical member;
    g. a retaining member having a complementary spherical surface engaging said spherical member;
    h. means for urging said retaining member against said sphere and, in turn, urging said sphere against said sealing member, whereby said lever is journaled on said sealing member;
    i. interengaging means on said sphere and said sealing member and said retaining member for guiding said lever so as to confine said lever longitudinal axis to rectilinear swinging movement about the center of said sphere in directions parallel and normal to the plane of symmetry which is normal to said control disc complementary flat surface and bisects said control disc and is perpendicular to a line passing through the centers of the control disc spaced openings, said interengaging means comprising projections extending radially from said spherical member transversely of said lever longitudinal axis and complementary slots in said sealing member and retaining member for receiving each said projection, said slots confining said spherical member to rotation about the axis of said projections and said projections to limited swinging motion such that their axis is movable only in a plane containing same and normal to said control disc complementary flat surface; and
    j. means interconnecting one end of said lever with said control disc such that swinging of said lever moves said control disc so that the centers of said control disc spaced openings are confined to rectilinear movement parallel to and normal to said plane of symmetry.

6. The single handle faucet valve as set forth by claim 5, wherein there is additionally provided limiting means engageable with said lever outwardly of said spherical member for limiting movement thereof within a substantially triangular area.

7. The single handle faucet valve as set forth by claim 6, wherein said limiting means comprises a recess in said retainer member through which said lever extends.

8. The single handle faucet valve as set forth by claim 7, wherein said recess is substantially triangular in transverse section and comprises inwardly converging sidewalls such that a peripheral bearing surface of said lever extending longitudinally thereof will be substantially contiguous with a sidewall portion when abutting same.